United States Patent [19]

Lilly

[11] Patent Number: 5,119,577
[45] Date of Patent: Jun. 9, 1992

[54] ICE FISHING DEVICE

[76] Inventor: Robert B. Lilly, 3158 Russell, Abilene, Tex. 79605

[21] Appl. No.: 669,637

[22] Filed: Mar. 14, 1991

[51] Int. Cl.⁵ .............................................. A01K 97/12
[52] U.S. Cl. ....................................................... 43/17
[58] Field of Search ............................................ 43/17

[56] References Cited

U.S. PATENT DOCUMENTS

| | | | |
|---|---|---|---|
| 3,060,616 | 10/1962 | Woodley | 43/17 |
| 4,566,216 | 1/1986 | Randall | 43/17 |
| 4,621,446 | 11/1986 | Anderson | 43/17 |
| 4,862,627 | 9/1989 | Keller | 43/17 |
| 5,020,263 | 6/1991 | Werner | 43/17 |
| 5,074,072 | 12/1991 | Serocki et al. | 43/17 |

Primary Examiner—Richard K. Seidel
Assistant Examiner—Jeanne M. Elpel

[57] ABSTRACT

An ice fishing device designed to be readily portable, to provide more effective and more enjoyable fishing and to provide an effective signal. The device is foldable into a relatively compact package so that it can be stacked with others for multiple carrying. It includes a reel and flexible rods to provide more effective setting of the hook and more sensation of playing the fish. It also includes a mechanical signal to indicate the bite of a fish.

8 Claims, 2 Drawing Sheets

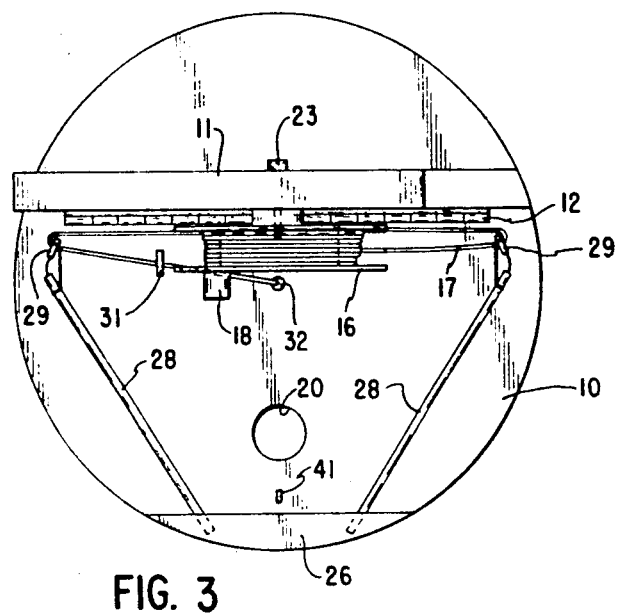
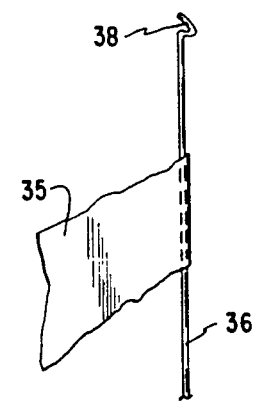
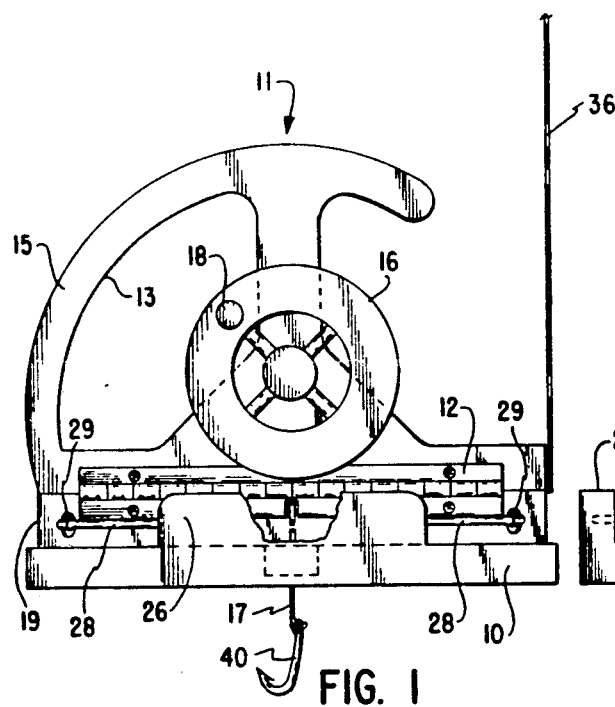
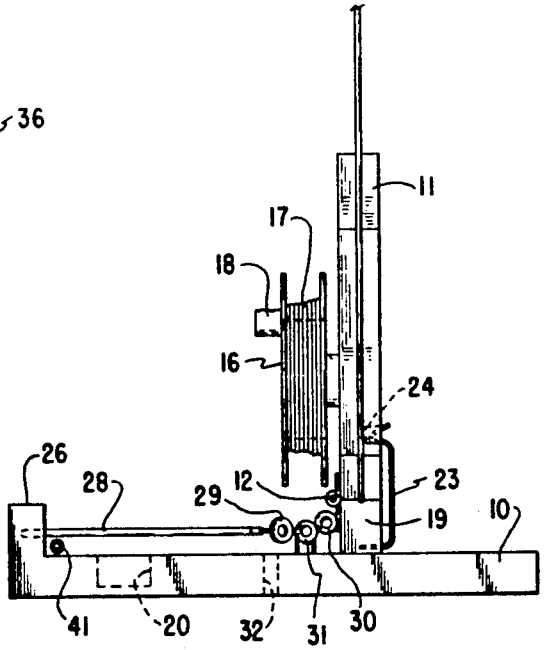
FIG. 3
FIG. 1
FIG. 2

ICE FISHING DEVICE

BACKGROUND AND SUMMARY OF THE INVENTION

This invention pertains to tackle for ice fishing and more particularly to a device adapted both to signal the bite of the fish and to make the catching of the fish more pleasurable by allowing for true playing of the fish rather than simply hauling the fish from the water.

Angling for fish through holes in the frozen surface of a lake or other body of water has provided recreation for many people for many years. Devices to accomplish the catching of a fish in such circumstances are numerous, ranging from a simple bar to which a line may be attached, to complex signalling devices adapted to relieve the angler from constant holding of a rod in cold weather. This freeing of the hands allows the angler the opportunity of moving about to keep warm, to eat, or to drink hot beverages without jeopardizing his opportunity of catching the fish.

Nearly all such static devices use a rigid pole or a hand over hand retrieval of the line to bring in the fish. Therefore, any playing of the fish on light tackle is negated, thus reducing the pleasure and challenge of landing the fish using light lines.

Most ice anglers use a bucket of some type to carry their equipment. The device of this invention is designed to be completely folded so that it can be stacked with others and thus several can be easily carried in a single bucket.

Other advantages will become apparent from the following detailed description of the device in reference to the drawings in which:

BRIEF DESCRIPTION OF THE DRAWINGS

FIG. 1 is an elevational view of the device unfolded and ready for use,

FIG. 2 is an edge elevational view of the device as in FIG. 1,

FIG. 3 is a top plan view of the device oriented as in FIG. 1,

DESCRIPTION

Figure 4:
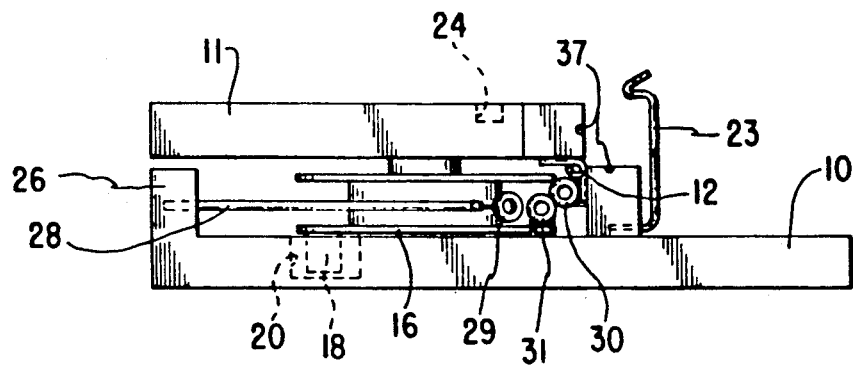
FIG. 4 is a view similar to FIG. 2 of the device in a folded position for carrying.

Briefly my invention comprises a piece of fishing tackle adapted especially for fishing through a hole in the ice and providing insulation to avoid freezing over of the hole as well as springy devices to make setting of the hook more certain, and playing of the fish more pleasurable. It is also designed for compact carrying and affirmative signalling of a fish bite.

More specifically and referring to the drawings, the entire device is mounted on a base 10. This base is made from an insulating material such as wood or possibly an insulating plastic material. The base is large enough to completely cover the normal hole cut in the ice for fishing and thus, when in place, it provides for insulation of the water beneath the ice from the colder ambient air temperature, thus inhibiting the freezing over of the hole in the ice. The base is also preferably circular or nearly that in plan form so that it can be conveniently stored in a bucket for carrying.

A handle 11 is attached to the base 10 by means of a hinge 12. The handle also is arcuate so that when folded to the position shown in FIG. 4, its perimeter lies within or contiguous with the boundaries of the base 10. The handle is formed with an opening 13 so as to provide a rim 14 which serves as a hand grip.

A reel 16 which may be simple flanged device as shown, or a more complex fly reel, is mounted on the handle 11 for rotation to take up or play out a fish line 17. A reel handle 18 is provided for operation of the reel.

As shown, the handle 11 is mounted on a flange 19 on the base 10 thus providing an offset so that when folded the reel 16 can be accommodated between the base and the handle. The reel handle 18 is provided for by forming a hole 20 in the base 10 into which the handle will project when unfolded. This not only provides for compact folding but also keeps the reel handle 18 from turning when the device is folded.

In order to hold the handle in its upright position as shown in FIGS. 1-3, a clip 23 is fixed in the flange 19. This clip extends upwardly and is adapted to engage the handle 11 in a recess 24. The tip 25 of the clip is bent slightly downward to hold the handle.

A second flange 26—in essence an edge—is formed on the base 10 in a position opposite the first flange 19. The edge 26 is also of the same height as the flange 19. Thus when the handle 11 is folded down, the edge 26 supports the handle 11 in approximately parallel position relative to the base 10.

A pair of tips 28 of unequal tension, similar to the tips of an ordinary casting rod, is mounted in the edge 26. The line 17 extends from the reel 16 through a guide 29 at the end of one of the tips 28. From that guide the line is run through a first eyelet 30 mounted on the flange to guide the line close to the flange. Then the line goes through the guide 29 on the second tip 28, and then back to a second eyelet 31 spaced from the flange 19 in order to avoid interference between the lines. From the second eyelet, the line runs through a hole 32 in the base and down into the water where the device is being used.

Figure 5:
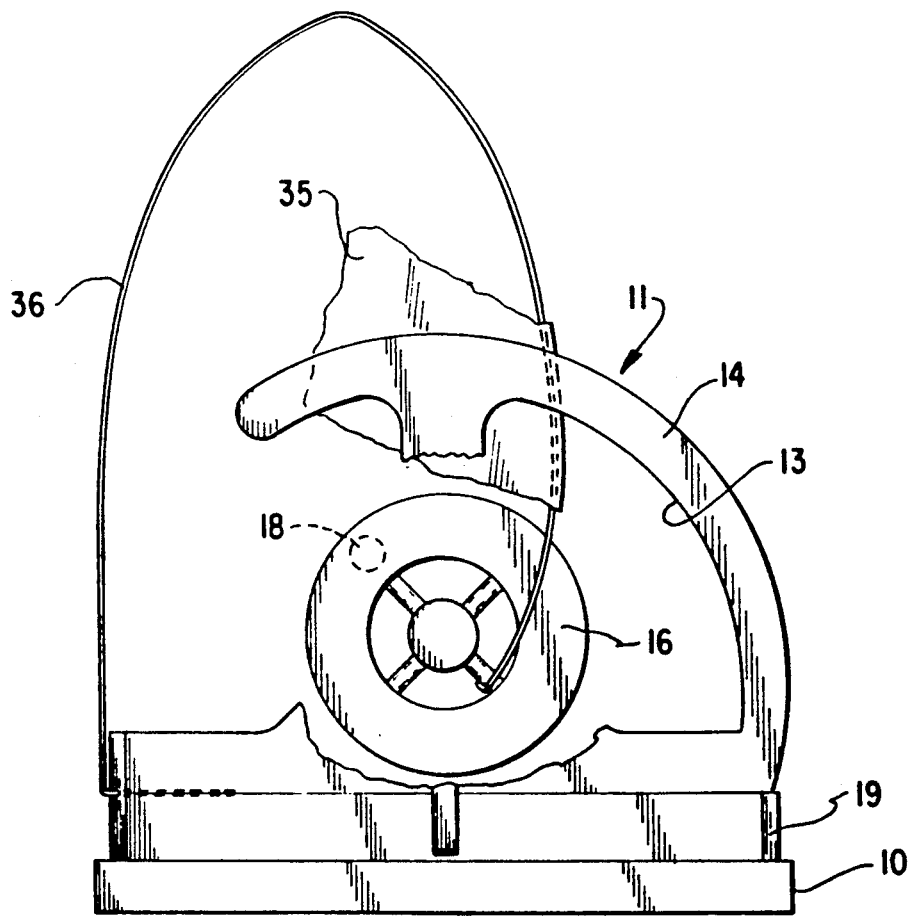
FIG. 5 is a view similar to FIG. 1 showing the signalling device cocked and ready for release by the bite of a fish.

As with most ice fishing devices, a signal device is also provided. This particular device includes a flag 35 mounted on a spring wire staff 36. The staff is removably inserted into a hole formed by a pair of grooves 37 in the handle 11 and the flange 19 (FIG. 4). Thus, when the handle is folded down, the flag staff is released. A hook 38 on the free end of the staff is designed to engage the reel 16 either on a spoke or on an inner rim where it will be held till the reel unwinds. When that happens, the staff will be released from its cocked position shown in FIG. 5 to its free and upright position shown in FIG. 2. For carrying, the staff can be flexed, placed on the base and held between the flanges 19 and edge 26.

In use, the handle is raised and held in the raised position by the clip 23. The line 17 is threaded through the guides 29 and the eyelets 30 and 31 as described, and then through the hole 32. The hook 40 or a lure is then tied to the line. The hook or lure is then dropped into the water through the hole in the ice in the usual manner. If the angler has more than one location, the flag signal may then be set and the device placed over the hole in the ice. Because the base 10 is made of wood or an insulating plastic, the water is insulated from ambient air, the temperature of which is usually much below freezing. Thus, the water is kept at temperatures slightly above freezing and the hole does not freeze shut.

When a fish strikes the baited hook or lure, the angler promptly takes the handle. The hook can then be set, and the tips 28 will provide a springing action similar to that of a casting rod. Because they are relatively short and of unequal tension, the use of two is desirable because, in essence, there is a mechanical advantage of two so that the force on this arrangement produces about the same action as would happen on a rod of twice the flexibility. In this way, in a compact space, the action of playing the fish is similar to that of a much longer rod. In test samples using the unequal tips and the system of stringing between them, the play is found to be the equivalent of an ordinary rod of four or five feet in length.

When fishing is through, the line 17 is wound back into the reel 16. If it is desired to leave the hook 40 tied to the line, a third eyelet 41 may be provided through which the hook may be hooked. The clip 23 is released, the staff 36 bent into a loop and placed on the base between the flange 19 and the edge 26, and the reel handle 18 placed so it fits into the hole 20 provided for it. The handle 11 is then collapsed onto the base 10 and the device is ready to be stacked with others into the angler's bucket.

I claim as my invention:

1. For fishing through a hole in the ice, an ice fishing device comprising a base adapted to rest on said ice so that the perimeter of said base extends beyond said hole, a flange on said base, a handle hinged to said flange along a hinge line spaced above said base, a reel rotatably mounted on said handle, said handle having a use position substantially perpendicular to said base and a storage position substantially parallel to but spaced from said base, said reel being mounted so that it lies between said handle and said base, fish line wound onto said reel, said base being formed with a hole therethrough said base including an edge raised from the upper surface of said base and substantially parallel to said flange, at least one springing rod tip mounted in said edge and extending over said base, line guides mounted on each said rod tip, said line being trained from said reel through said guides and thence through said hole in said base.

2. The device of claim 1 in which two said tips extend from said edge, said tips spreading apart from each other, said line extending from said reel through a first of said tips then through the second of said tips and then through the said hole.

3. The device of claim 2 in which said tips are of unequal tension.

4. The device of claim 2 in which flag signal means is mounted on said base, said signal means being engageable with said reel and being adapted to be released upon movement of said reel in response to a pull on said line.

5. The device of claim 4 in which said signal device is releasably mounted on said base for ready removal for storage.

6. The device of claim 5 in which said signal means includes a spring wire staff, said staff being normally held between said first named handle and said flange when said handle is in its use position.

7. The device of claim 1 in which a clip means is mounted on said flange and is engageable with said handle to hold said handle in its use position.

8. The device of claim 1 in which said reel includes a reel handle, said base being formed with a receiving hole extending from its upper surface only partly through said base, said receiving hole being located to receive said reel handle when said first named handle is in its storage position.

* * * * *